United States Patent
Kwon et al.

(10) Patent No.: US 8,349,514 B2
(45) Date of Patent: Jan. 8, 2013

(54) ELECTRODE CATALYST FOR FUEL CELLS, METHOD OF PREPARING THE ELECTRODE CATALYST, AND FUEL CELL INCLUDING ELECTRODE CONTAINING THE ELECTRODE CATALYST

(75) Inventors: Kyung-jung Kwon, Suwon-si (KR); Chan-ho Pak, Seoul (KR); Kang-hee Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 407 days.

(21) Appl. No.: 12/731,288

(22) Filed: Mar. 25, 2010

(65) Prior Publication Data

US 2010/0248076 A1 Sep. 30, 2010

(30) Foreign Application Priority Data

Mar. 27, 2009 (KR) ........................ 10-2009-0026507

(51) Int. Cl.
*H01M 4/92* (2006.01)
*H01M 4/88* (2006.01)

(52) U.S. Cl. ........ 429/487; 429/524; 429/525; 429/526; 429/528; 502/101

(58) Field of Classification Search .................. 429/487, 429/524, 525, 528, 526, 527; 501/101
See application file for complete search history.

(56) References Cited

U.S. PATENT DOCUMENTS

| 7,811,959 B2 * | 10/2010 | Lee et al. ....................... 502/101 |
| 2010/0151296 A1 * | 6/2010 | Lee et al. .......................... 429/30 |
| 2011/0081599 A1 * | 4/2011 | Lee et al. ....................... 429/489 |
| 2011/0151354 A1 * | 6/2011 | Jin et al. ......................... 429/489 |

FOREIGN PATENT DOCUMENTS

| JP | 5-267299 | 10/1993 |
| JP | 8-62393 | 3/1996 |
| JP | 2004-87454 | 3/2004 |
| JP | 2007-90157 | 4/2007 |
| KR | 0144373 | 4/1998 |

OTHER PUBLICATIONS

Abstract of JP 2007/090157, Apr. 2007.*
English translation of JP 2007/090157, Apr. 2007.*

* cited by examiner

*Primary Examiner* — Helene Klemanski
(74) *Attorney, Agent, or Firm* — Cantor Colburn LLP

(57) ABSTRACT

An electrode catalyst for fuel cells, a method of preparing the electrode catalyst, and a fuel cell including the electrode containing the electrode catalyst have been improved. The electrode catalyst includes a beryllium (Be) oxide catalyst, which oxidizes carbon monoxide included in a fuel gas into carbon dioxide, and a platinum (Pt) based catalyst. Thus, loss in catalytic activity of the Pt-based catalyst due to carbon monoxide is decreased, and the activity and life of the fuel cell including the electrode catalyst are improved.

8 Claims, 7 Drawing Sheets

ELECTRODE CATALYST FOR FUEL CELLS, METHOD OF PREPARING THE ELECTRODE CATALYST, AND FUEL CELL INCLUDING ELECTRODE CONTAINING THE ELECTRODE CATALYST

CROSS-REFERENCE TO RELATED APPLICATION

This application claims the benefit of Korean Patent Application No. 10-2009-0026507, filed on Mar. 27, 2009, in the Korean Intellectual Property Office, the disclosure of which is incorporated herein by reference.

BACKGROUND

1. Field

One or more embodiments relates to an electrode catalyst for fuel cells, a method of preparing the electrode catalyst, and a fuel cell including an electrode containing the electrode catalyst.

2. Description of the Related Art

Fuel cells produce electricity by a reaction between a fuel, such as hydrogen, and an oxidant, such as oxygen, whereby water is generated as a reaction product. Hydrogen is obtained by reacting raw materials such as methanol and water under the presence of a reformed catalyst. Fuel cells may be classified into polymer electrolyte membrane fuel cells (PEMFCs), direct methanol fuel cells (DMFCs), phosphoric acid fuel cells (PAFCs), molten carbonate fuel cells (MCFCs), and solid oxide fuel cells (SOFCs), according to the types of electrolyte and fuel used in the fuel cells. The operating temperatures and properties of the components of fuel cells vary depending on the electrolyte used.

In general, PEMFCs and DMFCs include a membrane-electrode assembly (MEA) having an anode, a cathode, and a polymer electrolyte disposed between the anode and the cathode. The anode includes a catalyst layer to catalyze the oxidation of the fuel. The cathode includes a catalyst layer to catalyze the reduction of the oxidant.

In general, catalysts containing platinum (Pt) as an active component are used as main components of anodes and cathodes. However, poisoning of the catalysts caused by carbon monoxide, which is included in the fuel supplied to the anode, may reduce the performance of the fuel cell.

SUMMARY

One or more embodiments include an electrode catalyst for fuel cells that improves the life of the fuel cell by including beryllium (Be) oxide, a method of preparing the electrode catalyst, and a fuel cell including an electrode containing the electrode catalyst.

According to one or more embodiments of the present invention, an electrode catalyst for a fuel cell includes a catalyst support and a mixed catalyst supported on the catalyst support, wherein the mixed catalyst includes a platinum (Pt)-based catalyst and a beryllium (Be) oxide catalyst.

According to one or more embodiments of the present invention, the amount of the beryllium oxide catalyst may be in a range of about 0.1 to about 10 moles of beryllium (Be) based on 1 mole of the Pt-based catalyst.

According to one or more embodiments of the present invention, the beryllium oxide catalyst may be represented by $BeO_x$, where x is a value in a range of about 0.5 to about 1.5.

According to one or more embodiments of the present invention, the Pt-based catalyst may be at least one selected from the group consisting of platinum (Pt), ruthenium (Ru), palladium (Pd), iridium (Ir), osmium (Os), a Pt—Ru alloy, a Pt—Os alloy, a Pt—Pd alloy and a Pt-M alloy, wherein M may be at least one selected from the group consisting of gallium (Ga), titanium (Ti), vanadium (V), chromium (Cr), manganese (Mn), iron (Fe), cobalt (Co), nickel (Ni), copper (Co), zinc (Zn), tin (Sn), molybdenum (Mo), tungsten (W), and rhodium (Rh).

According to one or more embodiments of the present invention, the mixed catalyst may include a mixture of a platinum (Pt)-based catalyst and a beryllium oxide catalyst.

According to one or more embodiments of the present invention, the catalyst support may include a carbonaceous catalyst or an inorganic particle.

According to one or more embodiments of the present invention, a method of preparing an electrode catalyst for a fuel cell includes: preparing a first dried support by impregnating a support with a first solution in which a beryllium (Be) oxide catalyst precursor is dissolved; preparing a second dried support by impregnating the first dried support with a second solution in which a platinum (Pt)-based catalyst precursor is dissolved; and thermally treating the second dried support in a reducing atmosphere.

According to one or more embodiments of the present invention, a fuel cell includes an electrode containing the electrode catalyst for a fuel cell described above, and an electrolyte membrane.

According to one or more embodiments of the present invention, the electrode may include an anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
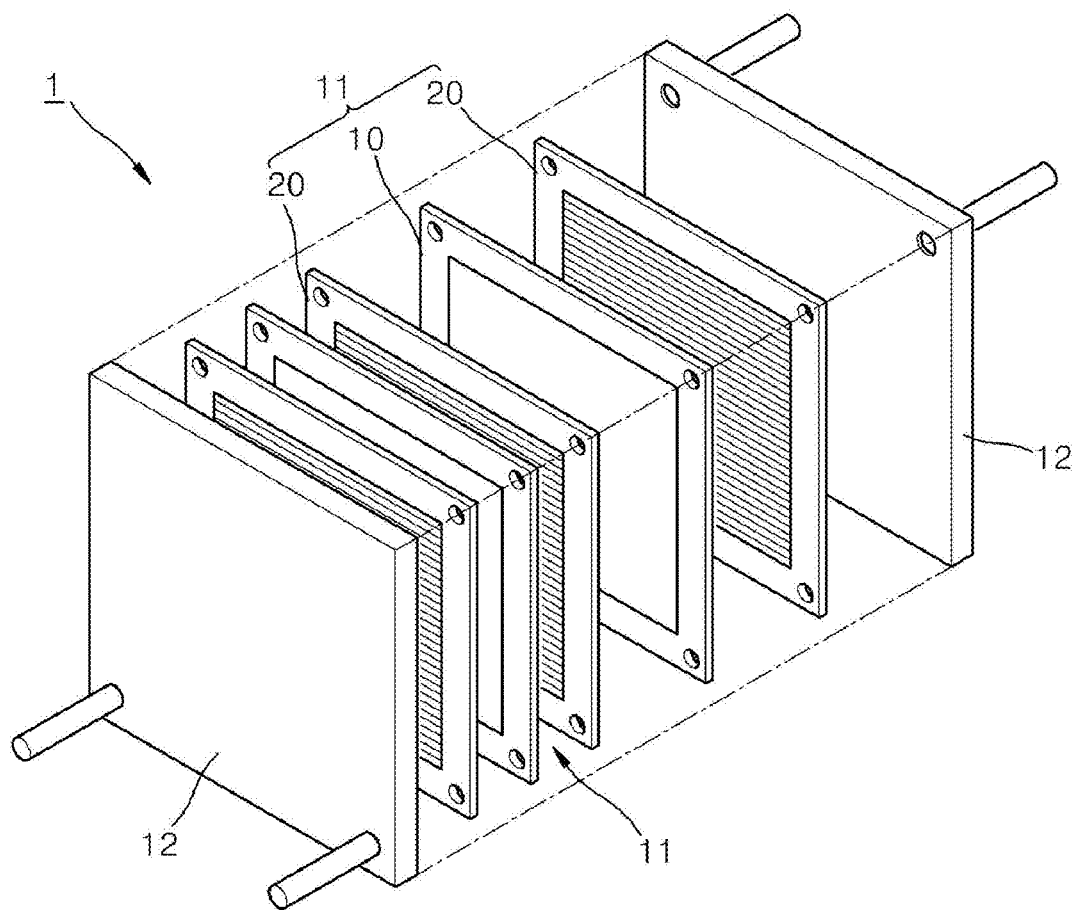
FIG. 1 is an exploded perspective view of a fuel cell according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

One or more embodiments includes an electrode catalyst for fuel cells that includes a catalyst support, and a platinum (Pt)-based catalyst and a beryllium (Be) oxide catalyst that are supported on the catalyst support.

General fuel cells include a solid polymer membrane disposed between an anode having a platinum catalytic layer and a cathode also having a platinum catalytic layer. In the anode, the following reaction takes place in the platinum (Pt) catalytic layer of the anode.

$$H_2 \rightarrow 2H^+ + 2e^-$$

H$^+$ produced from the reaction diffuses into an electrolyte of the solid polymer membrane. Meanwhile, in the cathode, the following reaction takes place in the platinum (Pt) catalytic layer of the cathode.

$$2H^+ + 2e^- + \tfrac{1}{2}O_2 \rightarrow H_2O$$

The electrode catalyst for fuel cells according to the present embodiment has improved durability by including a mixed catalyst of the Pt-based catalyst and the beryllium (Be) oxide catalyst. A polymer electrolyte membrane fuel cell (PEMFC), a phosphoric acid fuel cell (PAFC), or a direct methanol fuel cell (DMFC) may be manufactured with the electrode catalyst for fuel cells according to the present embodiment resulting in improved durability thereof.

For such fuel cells described above, fuel gas modified from liquefied natural gas (LNG), coal gas, methanol, or the like to contain abundant hydrogen is generally used as fuel. When such hydrocarbons are modified, carbon monoxide (CO) is inevitably produced and is supplied to the anode of fuel cells along with hydrogen (H$_2$). However, it is difficult to decrease the concentration of carbon monoxide (CO) to 10 ppm or less in the process of reforming to produce hydrogen (H$_2$). A trace amount of carbon monoxide (CO), i.e., a trace amount of impurity in the hydrogen fuel gas, markedly lowers the oxidation rate. For effective Pt-based catalysts, which accelerate chemical reactions, the catalytic activity thereof is decreased by carbon monoxide (CO). As a result, the lifespan of the fuel cell is shortened.

The electrode catalyst for fuel cells according to the present embodiment further includes beryllium (Be) oxide, in addition to the Pt-based catalyst, and thus, is more durable against the effects of carbon monoxide (CO). In other words, the beryllium (Be) oxide included in the electrode catalyst desorbs the carbon monoxide from the Pt-based catalyst by oxidizing it and thus forming carbon dioxide (CO$_2$), thereby preventing poisoning of the Pt-based catalyst and maintaining the activity of the Pt-based catalyst.

In other words, since the electrode catalyst according to the present embodiment has a structure in which the mixed catalyst of the Pt-based catalyst and the beryllium (Be) oxide catalyst is supported on a catalyst support, the problem of decreased catalytic activity of Pt catalysts and Pt-based alloy catalysts due to carbon monoxide may be resolved.

The electrode catalyst according to the present embodiment includes a Pt-based catalyst and a beryllium (Be) oxide, which may be included as a mixture thereof.

The Pt-based catalyst may be selected from the group consisting of platinum (Pt), ruthenium (Ru), palladium (Pd), iridium (Ir), osmium (Os), a Pt—Ru alloy, a Pt—Os alloy, a Pt—Pd alloy, a Pt-M alloy, and mixtures thereof, wherein M may be at least one selected from the group consisting of gallium (Ga), titanium (Ti), vanadium (V), chromium (Cr), manganese (Mn), iron (Fe), cobalt (Co), nickel (Ni), copper (Co), zinc (Zn), tin (Sn), molybdenum (Mo), tungsten (W), and rhodium (Rh). However, the Pt-based catalyst is not limited thereto, and any Pt-based catalyst may be used. The beryllium (Be) oxide catalyst included in the mixed catalyst may be represented by BeO$_x$, where x is a value in a range of about 0.5 to about 1.5, or in a range of about 0.8 to about 1.2.

Regarding the amounts of the Pt-based catalyst and the beryllium (Be) oxide catalyst included in the mixed catalyst, the amount of the beryllium (Be) oxide catalyst may be in a range of about 0.1 to about 10 moles of beryllium (Be) based on 1 mole of the Pt-based catalyst. When the amount of the beryllium (Be) oxide catalyst is within the above range, the catalytic activity of the electrode catalyst may be maintained, and the electrode catalyst may maintain sufficient durability against carbon monoxide (CO).

The above-described Pt-based catalyst and the beryllium (Be) oxide catalyst may be used alone, or may be supported on a catalyst support. A carbonaceous material, such as graphite, denka black, ketjen black, carbon black, acetylene black, carbon nanotubes, carbon nanofibers, carbon nanowires, carbon nanoballs, or activated carbon, may be used as the catalyst support. Alternatively, inorganic particles, such as alumina, silica, zirconia, or titania, may be used as the catalyst support.

One or more embodiments include a method of preparing the electrode catalyst for fuel cells described above, the method including preparing a first dried support by impregnating a carrier with a first solution in which a beryllium (Be) oxide catalyst precursor is dissolved; preparing a second dried support by impregnating the first dried support with a second solution in which a Pt-based catalyst precursor is dissolved; and thermally treating the second dried support in a reducing atmosphere.

The thermal treatment process used in the method according to the present embodiment may be performed in a reducing atmosphere, for example, at a temperature of about 150 to about 350° C. for about 0.5 to about 4 hours. The reducing atmosphere may be a hydrogen gas atmosphere. Interaction between the Pt-based catalyst and the beryllium (Be) oxide catalyst supported on the catalyst support may increase as a reduction reaction occurs in the thermal treatment process. The electrode catalyst for fuel cells may have a high catalytic activity as a result of being heat treated under the thermal treatment conditions described above.

An additional thermal treatment process may be further performed in an inert gas atmosphere, such as, in an argon atmosphere or a nitrogen atmosphere, after the thermal treatment in the reducing atmosphere has been performed. The additional thermal treatment process may be performed at a temperature of about 200° C. to about 350° C. for about 1 minute to about 10 hours.

The Pt-based catalyst precursor used in the method according to the present embodiment may be a halide, alkoxide, a carbonyl compound, a nitrate, or the like of a Pt-based metal, but is not limited thereto. The beryllium (Be) oxide catalyst precursor may be a halide, a nitrate, a sulfate or the like of beryllium (Be), but is not limited thereto.

A solvent for the first solution and the second solution in which the beryllium (Be) oxide catalyst precursor and the Pt-based catalyst precursor are respectively dissolved may be water, an organic solvent, or a mixed solvent of water and an organic solvent. The organic solvent may be alcohol, acetone, benzene, or the like. When a mixed solvent of water and an organic solvent is used, the organic solvent may be used in an amount of about 10 to about 1000 parts by weight based on 100 parts by weight of water.

One or more embodiments include a fuel cell including an electrode that contains the electrode catalyst for fuel cells described above, and an electrolyte membrane.

The electrode containing the electrode catalyst for fuel cells may be an anode. The electrolyte membrane may be a polymer electrolyte membrane disposed between the anode and a cathode.

The anode containing the electrode catalyst for fuel cells may include an electrode substrate and a catalyst layer. The catalyst layer may contain the Pt-based catalyst and the beryllium (Be) oxide catalyst supported on a catalyst support as described above. Like the anode, the cathode may include an electrode substrate and a catalyst layer. The catalyst layer of the cathode may contain any catalyst involved in chemical reactions of fuel cells. An example of the catalyst for the cathode may be a Pt-based catalyst. The Pt-based catalyst may be selected from the group consisting of platinum (Pt), ruthenium (Ru), osmium (Os), a Pt—Ru alloy, a Pt—Os alloy, a Pt—Pd alloy, a Pt-M alloy, and mixtures thereof, wherein M may selected from the group consisting of gallium (Ga), titanium (Ti), vanadium (V), chromium (Cr), manganese (Mn), iron (Fe), cobalt (Co), nickel (Ni), copper (Co), zinc (Zn), tin (Sn), molybdenum (Mo), tungsten (W), rhodium (Rh), and mixtures thereof. The Pt-based catalyst may include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

The metallic catalyst in the catalyst layer of the cathode may be used alone, or may be supported on a catalyst support. A carbonaceous material, such as graphite, denka black, ketjen black, carbon black, acetylene black, carbon nanotubes, carbon nanofibers, carbon nanowires, carbon nanoballs, or activated carbon, may be used as the catalyst support. Alternatively, inorganic particles, such as alumina, silica, zirconia, or titania, may be used as the catalyst support. When a noble metal on a support is used, any commercially available catalyst may be used, or a catalyst prepared by supporting a noble metal on a support may be used.

According to an embodiment, the catalyst layers of the anode and the cathode may further contain a binder resin to increase adhesiveness of the catalyst layers and to facilitate migration of protons. The binder resin may be a proton-conducting polymer resin. The binder resin may be any proton-conducting polymer resin having a cation exchange group selected from the group consisting of a sulfonic acid group, a carboxylic acid group, a phosphoric acid group, a phosphonic acid group, and derivatives thereof. For example, the proton-conducting polymer resin may include at least one proton-conducting polymer selected from the group consisting of a fluorine polymer, a benzimidazolyl polymer, a polyimide polymer, a polyether imide polymer, a polyphenylene sulfide polymer, a polysulfone polymer, a polyether sulfone polymer, a polyether ketone polymer, a polyether-etherketone polymer, and a polyphenylquinoxaline polymer. Alternatively, the proton-conducting polymer resin may include at least one proton-conducting polymer selected from the group consisting of poly(perfluorosulfonic acid), poly(perfluorocarboxylic acid), a tetrafluoroethylene-fluorovinylether copolymer including a sulfonic acid group, defluorinated polyetherketone sulfide, arylketone, and poly(2,2'-m-phenylene)-5,5'-bibenzimidazole, poly(2,5-benzimidazole).

In such proton-conducting polymers, hydrogen (H) in a cation exchange group of the side chain terminal thereof may be substituted with sodium (Na), potassium (K), lithium (Li), cesium (Cs), or tetrabutylammonium. Hydrogen (H) in the cation exchange group of the side chain terminal may be substituted with sodium (Na) using sodium hydroxide (NaOH) or with tetrabutylammonium using tetrabutylammonium hydroxide when preparing a catalyst composition. In addition, appropriate compounds may be used to substitute the hydrogen with potassium (K), lithium (Li), or cesium (Cs).

The binder resin may be used as a single compound or included in a mixed compound. Alternatively, the binder resin may be used along with a non-conductive polymer in order to further increase the adhesiveness to the polymer electrolyte membrane. The amount of the binder resin may be appropriately adjusted according to the purpose of use. The non-conductive polymer may include at least one selected from the group consisting of polytetrafluoroethylene (PTFE), a tetrafluoroethylene-hexafluoropropylene (FEP) copolymer, tetrafluoroethylene-perfluoroalkylvinylether (PFA) copolymer, ethylene/tetrafluoroethylene (ETFE), ethylenechlorotrifluoro-ethylene (ECTFE) copolymer, polyvinylidenefluoride, a polyvinylidenefluoride-hexafluoropropylene (PVDF-HFP) copolymer, dodecylbenzenesulfonic acid, and sorbitol.

The electrode substrate on which the catalyst layer is formed supports the electrode and diffuses fuel or an oxidant towards the catalyst layer. The electrode substrate may be a conductive substrate. Examples of the conductive substrate may include a carbon paper, a carbon cloth, a carbon felt, a metal cloth, which is a porous film consisting of fibrous metal or a cloth having a metallic film on its surface formed of polymeric fiber, or the like, but are not limited thereto.

Alternatively, the electrode substrate may be treated with a fluorine resin in order to be water-repellent. In this case, a reduction in the diffusion efficiency of reactants may be prevented by blocking the water generated as the fuel cell operates. The fluorine resin may include polytetrafluoroethylene (PTFE), polyvinylidenefluoride, polyhexafluoropropylene, polyperfluoroalkylvinylether, polyperfluorosulfonylfluoride, alkoxyvinylether, fluororinated ethylene propylene (FEP), polychlorotrifluoroethylene, or a copolymer thereof.

The electrode substrate may further include a microporous layer to increase the effect of diffusing reactants. In general, the microporous layer may contain conductive powder having a small diameter, for example, carbon powder, carbon black, acetylene black, activated carbon, carbon fibers, fullerene, carbon nanotubes, carbon nanowires, carbon nanohorns, or carbon nanorings. The microporous layer may be formed by coating the electrode substrate with a composition containing conductive powder, a binder resin and a solvent. The binder resin may include polytetrafluoroethylene (PTFE), polyvinylidenefluoride, polyhexafluoropropylene, polyperfluoroalkylvinylether, polyperfluorosulfonylfluoride, alkoxyvinyl ether, polyvinyl alcohol, cellulose acetate, or copolymers thereof.

The solvent used for the microporous layer may include alcohols, including ethanol, isopropylalcohol (IPA), n-propyl alcohol, and butylalcohol, water, dimethylacetamide (DMAc), dimethylsulfoxide (DMSO), N-methylpyrrolidone (NMP), tetrahydrofuran, or the like. The coating method may include screen printing, spray coating, or coating using a doctor blade, but is not limited thereto.

The polymer electrolyte membrane disposed between the cathode and the anode may be a general polymer electrolyte membrane used in fuel cells or may be manufactured using polymer resin having proton conductivity. The binder resin may be any proton-conducting polymer resin having a cation exchange group selected from the group consisting of a sulfonic acid group, a carboxylic acid group, a phosphoric acid group, a phosphonic acid group, and derivatives thereof. For example, the polymer resin may be include least one polymer selected from the group consisting of a fluorine polymer, a benzimidazolyl polymer, a polyimide polymer, a polyetherimide polymer, a polyphenylenesulfide polymer, a polysulfone polymer, a polyethersulfone polymer, a polyetherketone polymer, a polyether-etherketone polymer, and a polyphenylquinoxaline polymer. Alternatively, the polymer resin may include at least one polymer selected from the group consisting of poly(perfluorosulfonic acid), poly(perfluorocarboxylic acid), a tetrafluoroethylene-fluorovinylether copolymer including a sulfonic acid group, defluorinated polyetherketone sulfide, arylketone, poly(2,2'-m-phenylene)-5,5'-bibenzimidazole, and poly(2,5-benzimidazole).

In such proton-conducting polymers, hydrogen (H) in the proton conductive group of the polymer may be substituted with sodium (Na), potassium (K), lithium (Li), cesium (Cs), or tetrabutylammonium. The hydrogen (H) in the proton conductive group of a proton-conducting polymer may be substituted with sodium (Na) using sodium hydroxide (NaOH) or with tetrabutylammonium using tetrabutylammonium hydroxide. In addition, appropriate compounds may be used to substitute the hydrogen with potassium (K), lithium (Li), or cesium (Cs).

Figure 2:
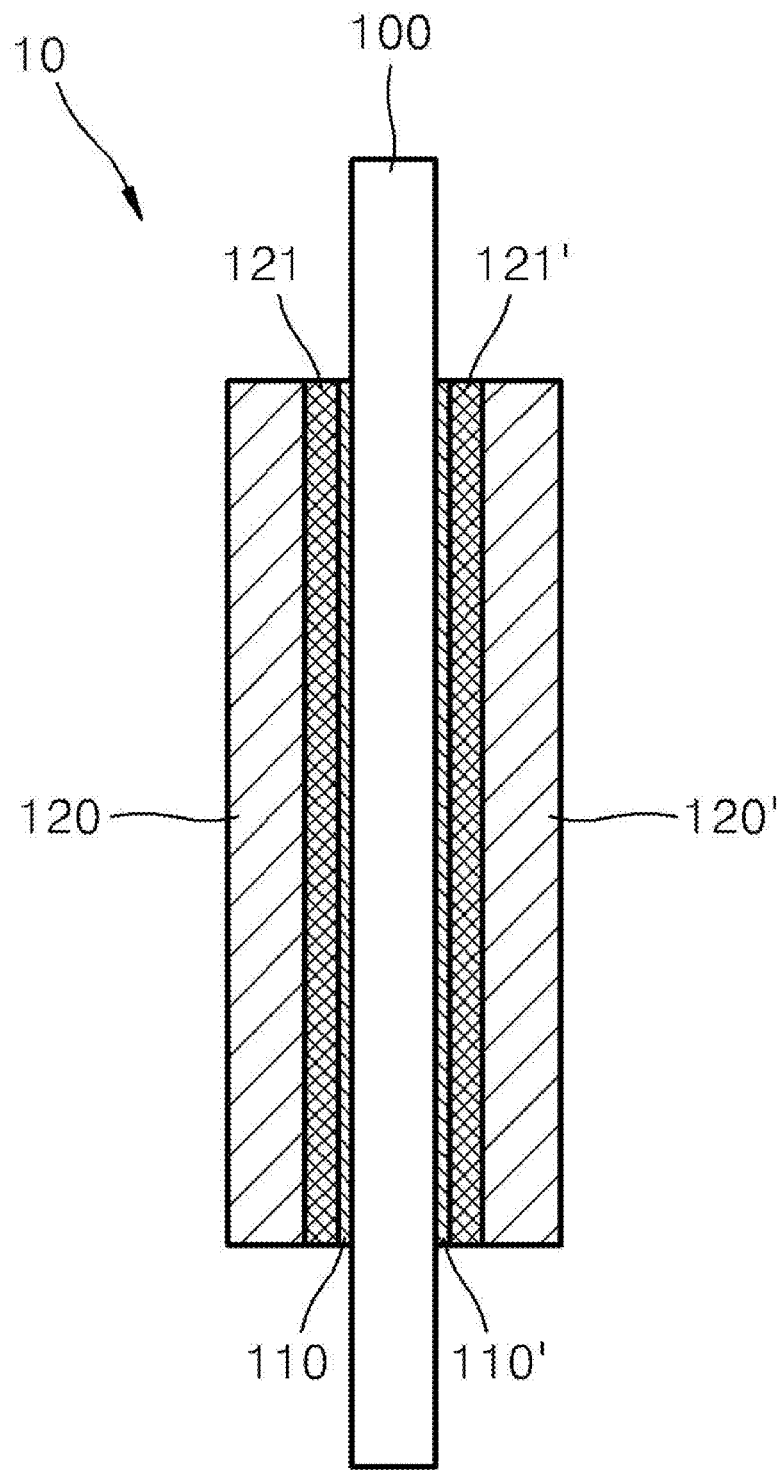
FIG. 2 is a cross-sectional view of a membrane-electrode assembly (MEA) included in the fuel cell of FIG. 1, according to an embodiment.

FIG. 1 is an exploded perspective view of a fuel cell 1 according to an embodiment, and FIG. 2 is a cross-sectional view of a membrane-electrode assembly (MEA) 10 of the fuel cell 1 of FIG. 1, according to an embodiment. Referring to FIG. 1, the fuel cell 1 according to the present embodiment is formed of two unit cells 11 supported by a pair of end plates 12. Each unit cell 11 is composed of a membrane-electrode assembly (MEA) 10, and bipolar plates 20 respectively disposed on both sides of the MEA 10 in the thickness direction thereof. The bipolar plates 20 may be current collectors and may include a conductive metal, carbon, or the like, while providing oxygen and fuel to the catalytic layers of the MEAs 10.

Although only two unit cells 11 are illustrated in FIG. 1, the number of unit cells 11 is not limited to two and the fuel cell 1 may have several tens or hundreds of unit cells 11, depending on the properties of the fuel cell 1.

Referring to FIG. 2, each MEA 10 includes an electrolyte membrane 100, catalytic layers 110 and 110' respectively disposed on each side of the electrolyte membrane 100 in the thickness direction thereof, first gas diffusion layers 121 and 121' respectively stacked on the catalytic layers 110 and 110', and second gas diffusion layers 120 and 120' respectively stacked on the first gas diffusion layers 121 and 121'.

The catalytic layers 110 and 110' are a fuel electrode and an oxygen electrode, respectively, each of which includes a catalyst and a binder therein. The catalytic layers 110 and 110' may further include a material to increase the electrochemical surface area of the catalyst.

The first gas diffusion layers 121 and 121' and the second gas diffusion layers 120 and 120' are substrates of the electrodes described above and diffuse oxygen and fuel supplied through the bipolar plates 20 throughout the entire surfaces of the catalyst layers 110 and 110'.

The fuel cell 1 including such an MEA 10 operates at a temperature of about 100 to about 300° C. Fuel, such as hydrogen, is supplied through one of the bipolar plates 20 into one of the catalytic layers 110 and 110', and an oxidant such as oxygen is supplied through the other bipolar plate 20 into the other catalytic layer. Then, hydrogen is oxidized into protons in the first catalytic layer, and the protons are conducted to the second catalytic layer through the electrolyte membrane. Then, the protons electrochemically react with oxygen in the second catalytic layer to produce water. Thus, the fuel cell 1 generates electrical energy. Moreover, hydrogen supplied as a fuel may be hydrogen produced by reforming hydrocarbons or alcohols. Oxygen supplied as an oxidant may be supplied in the form of air.

Hereinafter, the one or more embodiments will be described more specifically with reference to the following examples. These examples are for illustrative purposes only and are not intended to limit the scope of the one or more embodiments.

EXAMPLE 1

In order to prepare a supported catalyst including Pt and $BeO_x$ (x=1) in a ratio of 1:2.3, 1 g of a carbon support was placed in a vinyl bag. 0.4432 g of $BeCl_2$ was dissolved in 2 ml of a mixed solution (1:1 in a volumetric ratio) of water and acetone and then mixed with the carbon support in the vinyl bag. Then, the mixture was dried at room temperature for 5 hours. 1.1306 g of $H_2PtCl_6$ was dissolved in 3 ml of acetone and then mixed with the dried carbon support in the vinyl bag for 10 minutes. Then, the mixture was dried in air for 2 hours. The dried carbon support was placed in a crucible and further dried in a dryer at 60° C. overnight. Then the crucible was placed in an electric furnace through which nitrogen was passed for 10 minutes. The flowing gas in the electric furnace was replaced with hydrogen, and the temperature was increased to 200° C. and maintained for 2 hours to induce reduction. The gas flowing in the electric furnace was then replaced with nitrogen. The temperature was increased to 250° C. at a rate of 5° C./min, maintained for 5 hours, and then slowly cooled to room temperature.

EXPERIMENTAL EXAMPLE 1

Structural Analysis

Figure 3:
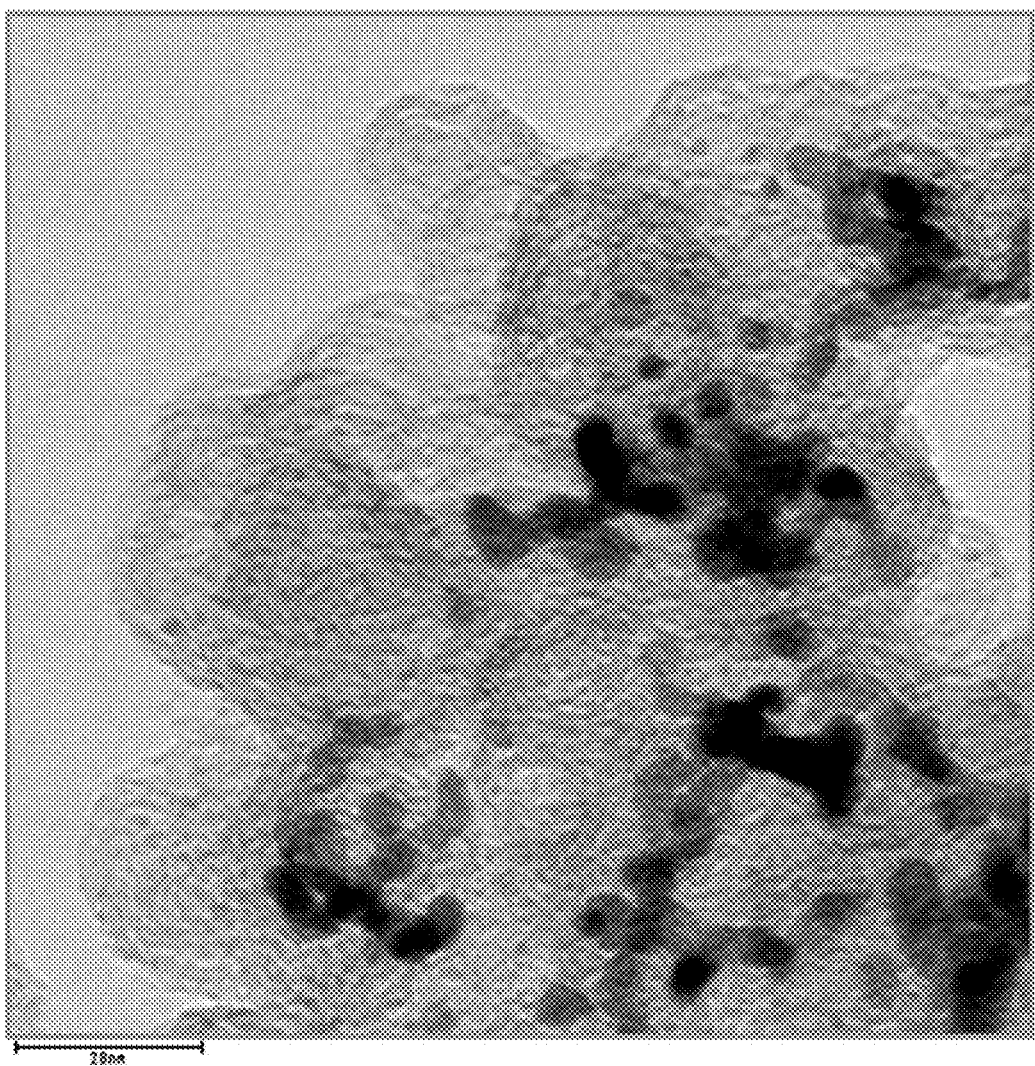
FIG. 3 is a transmission electron microscopic (TEM) image of a mixed catalyst obtained in Example 1.

FIG. 3 is a transmission electron microscopic (TEM) image as a result of surface analysis on Pt—$BeO_x$ (x=1), which is the mixed catalyst prepared in Example 1. It can be confirmed from FIG. 3 that Pt particles having an average diameter of 4 nm are distributed on the carbon support.

Figure 4:
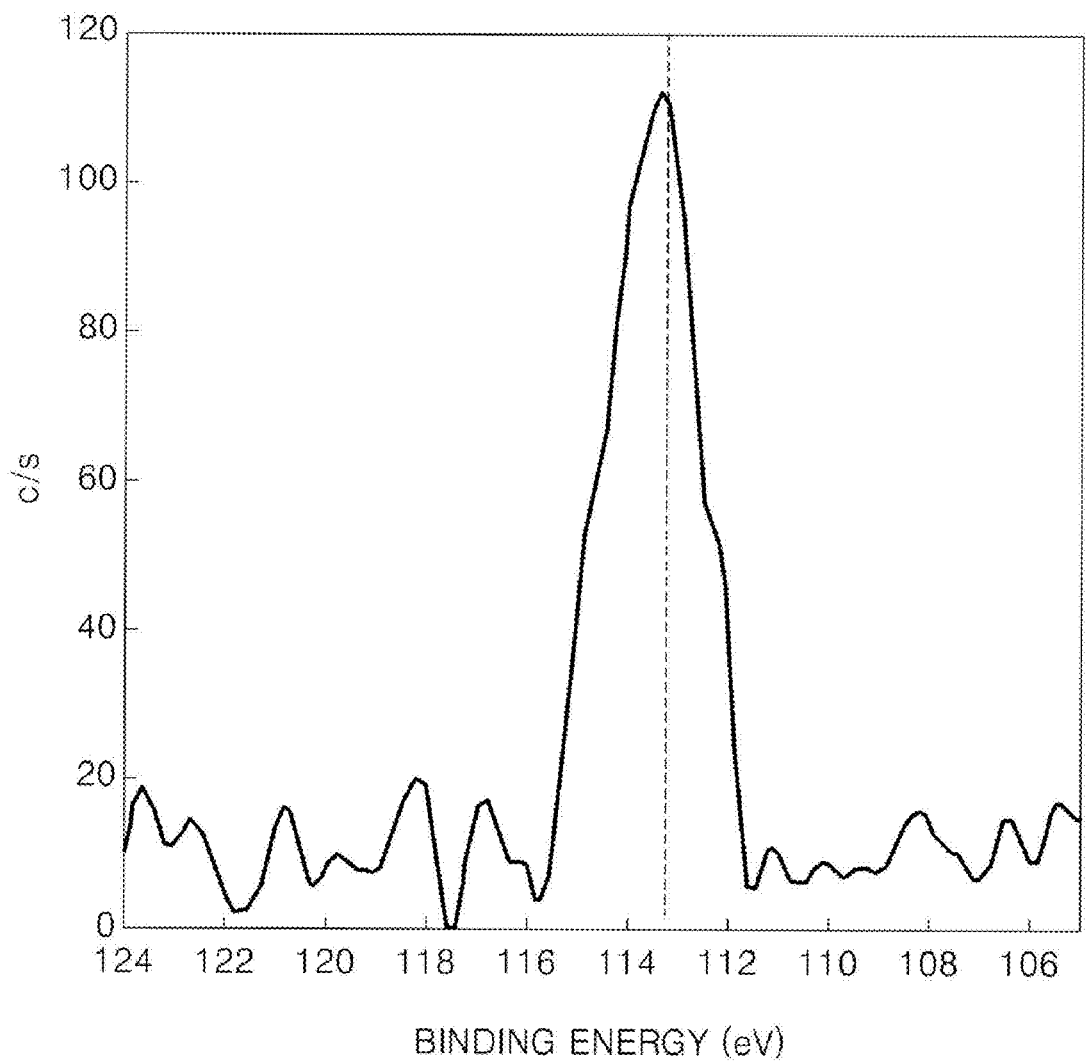
FIG. 4 is an X-ray photoelectron spectroscopic (XPS) image of Pt—$BeO_x$ (x=1) obtained in Example 1.

FIG. 4 is an X-ray photoelectron spectroscopic (XPS) image of Pt—$BeO_x$ (x=1) obtained in Example 1. FIG. 4 shows that a peak value of the binding energy of Be (1s) matches that of beryllium oxide.

Figure 5:
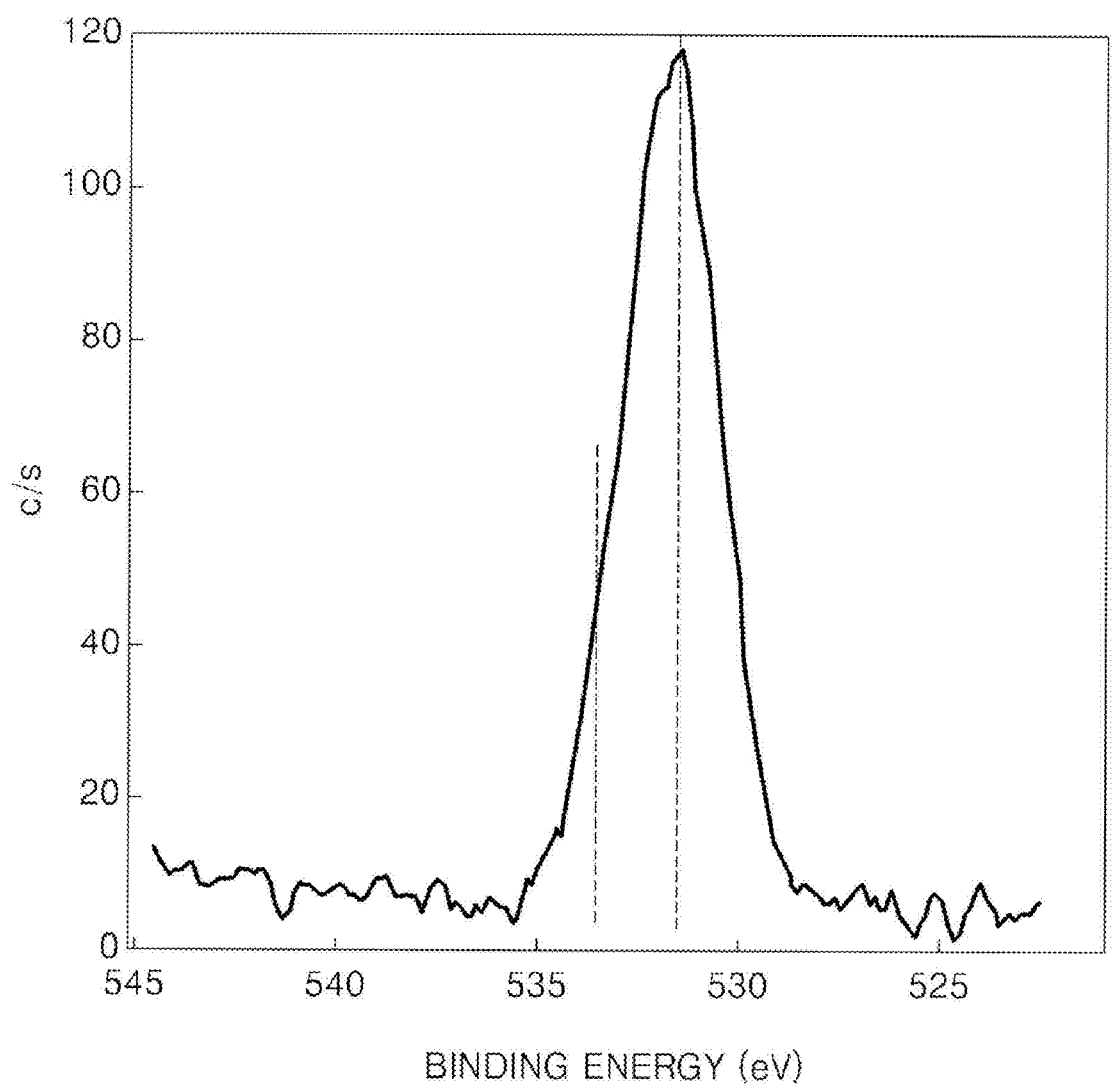
FIG. 5 is an XPS image of Pt—$BeO_x$ (x=1) obtained in Example 1.

FIG. 5 is an XPS image of Pt—$BeO_x$ (x=1) obtained in Example 1. FIG. 5 shows that oxygen is bound with beryllium (Be) or carbon. This indicates that Be exists as an oxide, rather than forming an alloy with Pt, in the mixed catalyst.

EXPERIMENTAL EXAMPLE 2

Electrochemical Characteristics Evaluation

Electrochemical characteristics of the mixed catalyst obtained in Example 1 were evaluated after a thin film-type electrode was manufactured using a rotating disk electrode (RDE). The electrochemical evaluation was performed using a three-electrode system, a 0.1 M-$HClO_4$ solution as an electrolyte, and a Pt foil, and a Ag/AgCl electrode, respectively, as a counter electrode and a reference electrode. All the electrochemical experiments were performed at room temperature.

Figure 6:
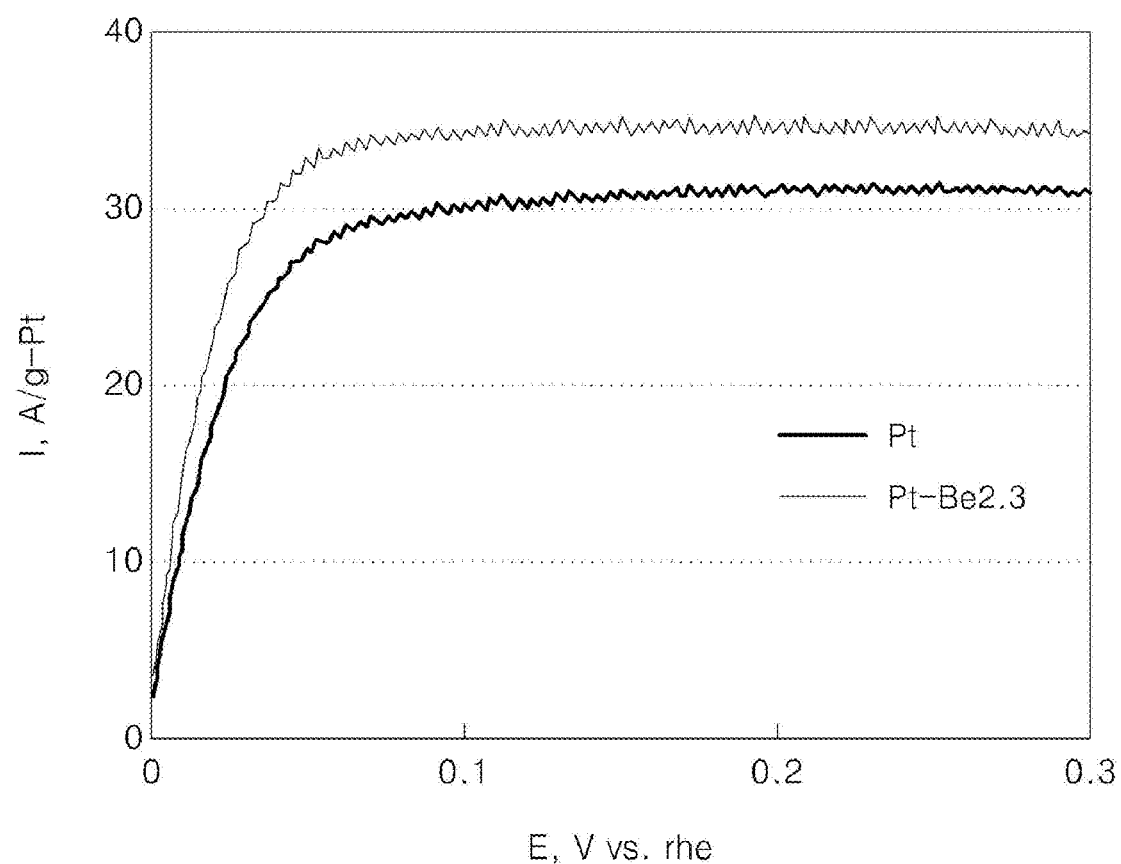
FIG. 6 is a graph of the hydrogen oxidation reaction (HOR) activity of the mixed catalyst obtained in Example 1.

FIG. 6 is a graph of the hydrogen oxidation reaction (HOR) activity of the mixed catalyst obtained in Example 1. Herein, the scanning rate was 5 mV/s, and the electrode rotation rate was 900 rpm. The HOR activity was evaluated by dissolving hydrogen in an electrolyte to saturation and then increasing potential from the open circuit voltage (OCV) while recording the corresponding currents. The HOR current of the mixed catalyst, which includes Pt and Be in an atomic ratio of 1:2.3, is higher than that of the Pt catalyst, indicating that the mixed catalyst may be used as an anode catalyst of fuel cells in which HOR reaction takes place.

Figure 7:
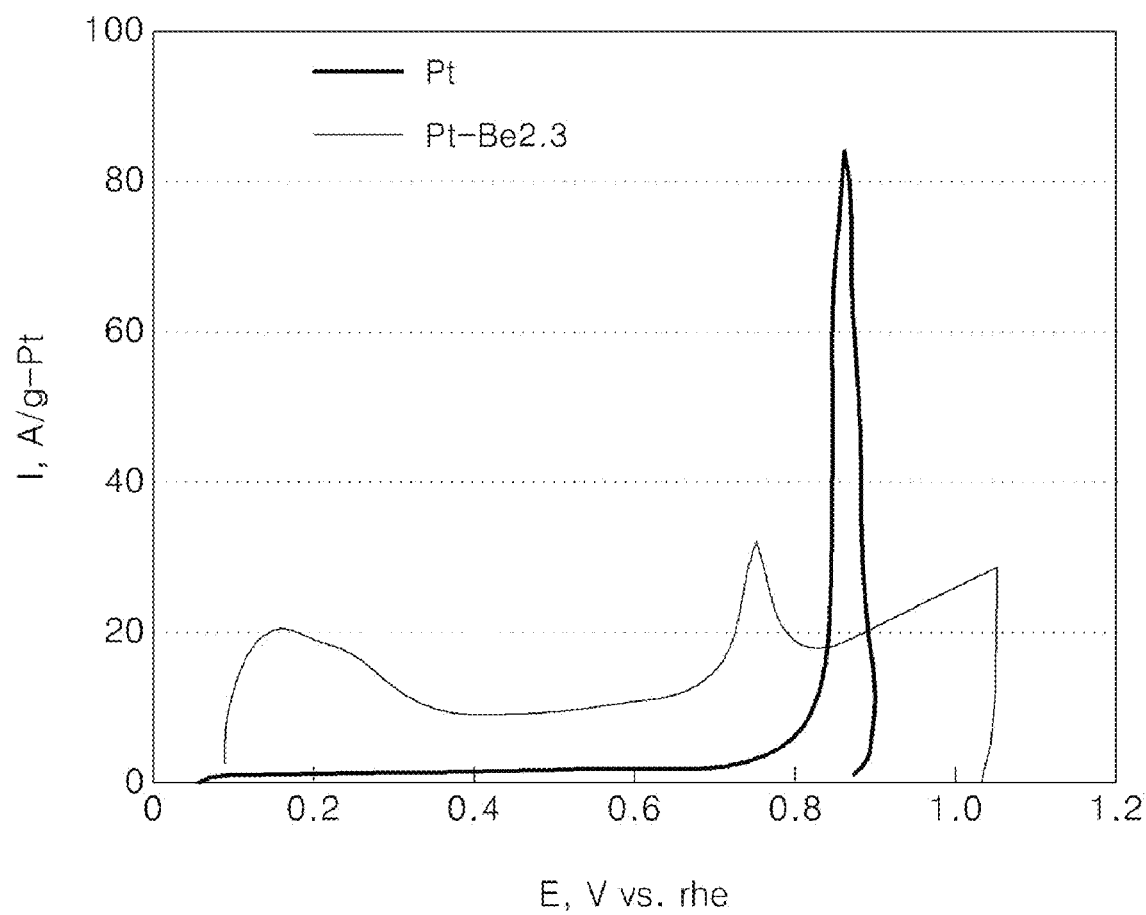
FIG. 7 is a graph of CO stripping voltammetry results, which illustrate CO tolerance.

FIG. 7 is a graph of CO stripping voltammetry results, which illustrates CO tolerance. In an electrolyte saturated with CO, the CO saturated at a low voltage of about 0.05 V adsorbs into Pt. In addition, when the potential is increased, the CO desorption current flows. If the adsorbed CO starts to be desorbed at a lower potential, this means that the CO tolerance is greater. In the Pt catalyst not including Be, the CO desorption current flows at about 0.85 V. However, in the mixed catalyst according to Example 1, which includes Pt and Be in an atomic ratio of 1:2.3, CO starts to be desorbed at about 0.7 V. This confirms that the desorption of CO is easier in the presence of beryllium oxide.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode catalyst for a fuel cell, the electrode catalyst comprising:
   a catalyst support and a mixed catalyst supported on the catalyst support,
   wherein the mixed catalyst comprises a platinum (Pt)-based catalyst and a beryllium (Be) oxide.

2. The electrode catalyst of claim 1, wherein the amount of the beryllium oxide is in a range of about 0.1 to about 10 moles of beryllium (Be) based on 1 mole of the Pt-based catalyst.

3. The electrode catalyst of claim 1, wherein the beryllium oxide is represented by $BeO_x$, in which x is in a range of about 0.5 to about 1.5.

4. The electrode catalyst of claim 1, wherein the Pt-based catalyst comprises at least one selected from the group consisting of platinum (Pt), ruthenium (Ru), palladium (Pd), iridium (Ir), osmium (Os), a Pt—Ru alloy, a Pt—Os alloy, a Pt—Pd alloy, a Pt-M alloy, and mixtures thereof, where M is at least one selected from the group consisting of gallium (Ga), titanium (Ti), vanadium (V), chromium (Cr), manganese (Mn), iron (Fe), cobalt (Co), nickel (Ni), copper (Co), zinc (Zn), tin (Sn), molybdenum (Mo), tungsten (W), rhodium (Rh), and mixtures thereof.

5. The electrode catalyst of claim 1, wherein the catalyst support comprises a carbonaceous catalyst or an inorganic particle.

6. A method of preparing an electrode catalyst for a fuel cell, the method comprising:
   preparing a first dried support by impregnating a support with a first solution in which a beryllium (Be) oxide precursor is dissolved;
   preparing a second dried support by impregnating the first dried support with a second solution in which a platinum (Pt)-based catalyst precursor is dissolved; and
   thermally treating the second dried support in a reducing atmosphere.

7. A fuel cell comprising:
   an electrode comprising the electrode catalyst for a fuel cell according to claim 1; and
   an electrolyte membrane.

8. The fuel cell of claim 7, wherein the electrode comprises an anode.

* * * * *